United States Patent
Nakane

(10) Patent No.: US 10,089,562 B2
(45) Date of Patent: Oct. 2, 2018

(54) IMAGE PROCESSING APPARATUS AND IMAGE PROCESSING METHOD FOR ESTIMATING TIME REQUIRED FOR PRINT PROCESSING

(71) Applicant: CANON KABUSHIKI KAISHA, Tokyo (JP)

(72) Inventor: Hiroyuki Nakane, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/257,744

(22) Filed: Sep. 6, 2016

(65) Prior Publication Data
US 2017/0076187 A1     Mar. 16, 2017

(30) Foreign Application Priority Data
Sep. 11, 2015 (JP) .................... 2015-179098

(51) Int. Cl.
*G06K 15/02* (2006.01)
*G06F 3/12* (2006.01)
*G06K 15/00* (2006.01)

(52) U.S. Cl.
CPC ....... *G06K 15/1867* (2013.01); *G06K 15/002* (2013.01); *G06K 15/1807* (2013.01); *G06K 15/1813* (2013.01); *G06K 15/1836* (2013.01); *G06K 15/1849* (2013.01)

(58) Field of Classification Search
CPC combination set(s) only.
See application file for complete search history.

(56) References Cited

U.S. PATENT DOCUMENTS

| | | | |
|---|---|---|---|
| 2001/0055015 A1* | 12/2001 | Iourcha | G06T 15/40 345/421 |
| 2010/0245889 A1* | 9/2010 | Nguyen | G06F 3/1205 358/1.15 |
| 2012/0287476 A1* | 11/2012 | Sonogi | H04N 1/40 358/3.01 |
| 2013/0044336 A1* | 2/2013 | Matsui | G06K 15/1855 358/1.9 |
| 2016/0283829 A1* | 9/2016 | Ishiguro | G06K 15/186 |

FOREIGN PATENT DOCUMENTS

JP      2011-031580 A      2/2011

* cited by examiner

*Primary Examiner* — Helen Zong
(74) *Attorney, Agent, or Firm* — Canon U.S.A., Inc. IP Division

(57) ABSTRACT

When time required for print processing is estimated, estimation in consideration of overlap between objects is performed in such a manner that the objects are regarded as objects with a predetermined simple shape.

20 Claims, 13 Drawing Sheets

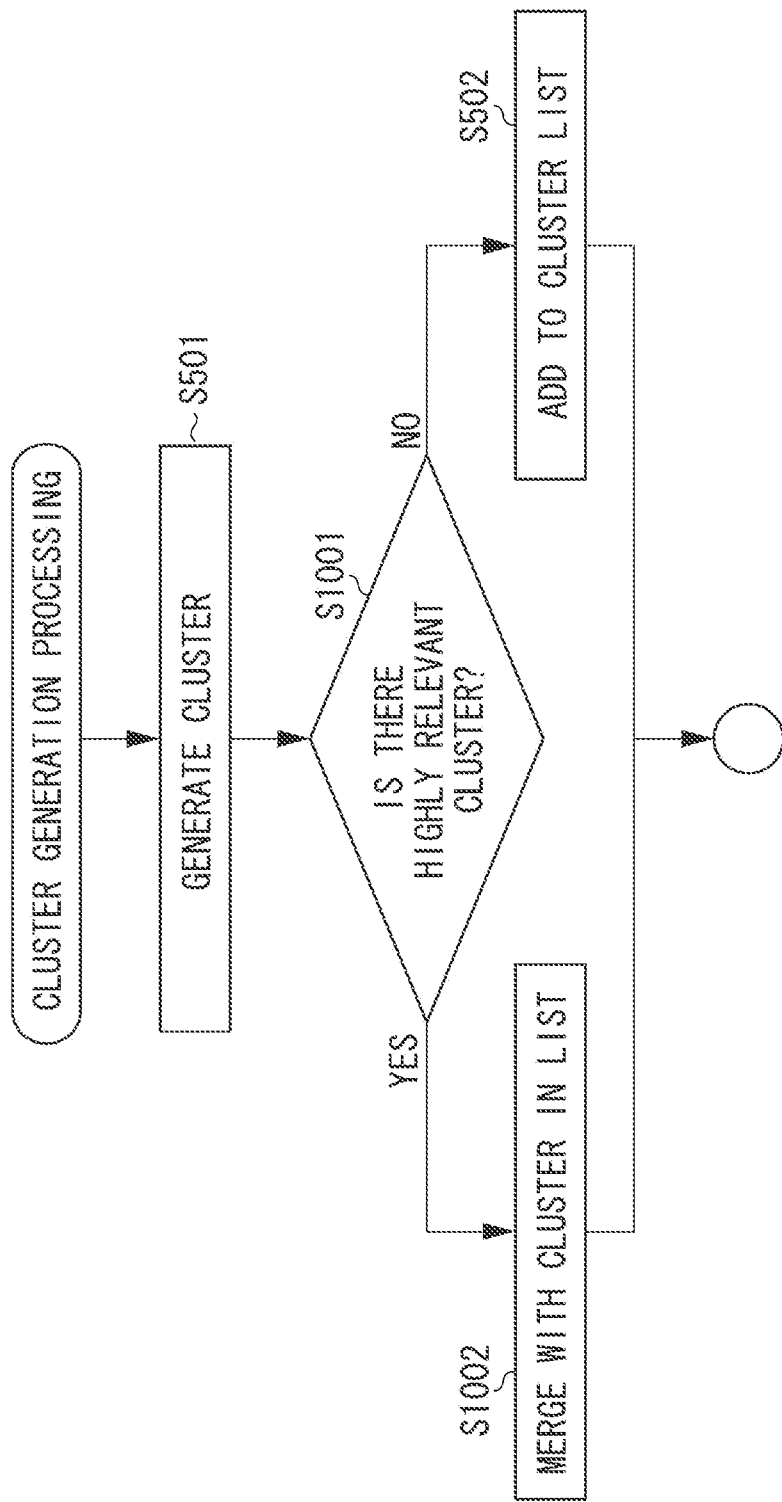

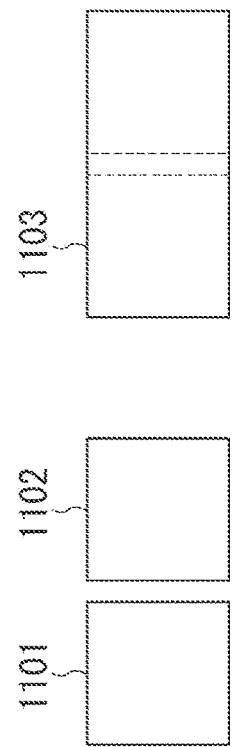
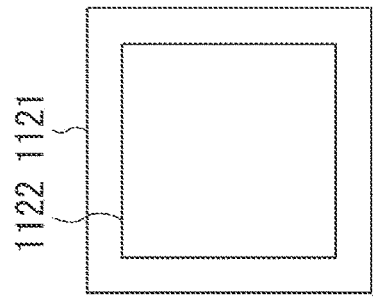
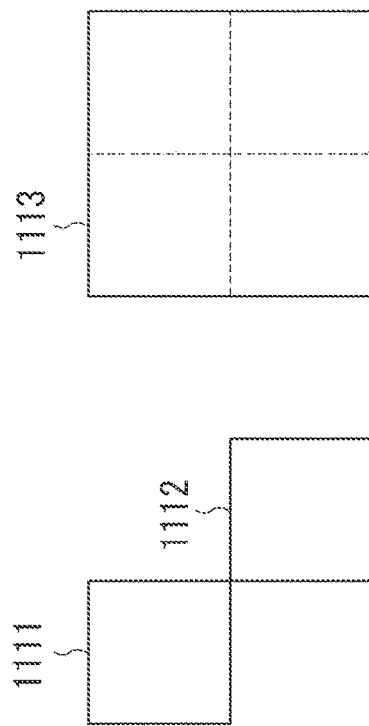
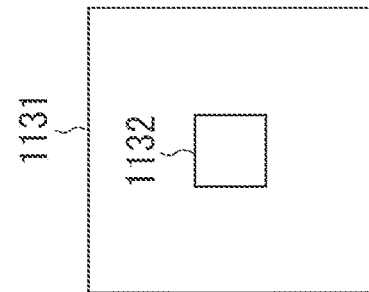

IMAGE PROCESSING APPARATUS AND IMAGE PROCESSING METHOD FOR ESTIMATING TIME REQUIRED FOR PRINT PROCESSING

BACKGROUND OF THE INVENTION

Field of the Invention

The present invention relates to a technique of estimating time required for print processing for print data.

Description of the Related Art

Print processing for print data described in a page description language (PDL) includes generating intermediate data from the print data and generating a bitmap image based on the intermediate data. Time required for the print processing (referred to as print processing time) can be estimated with known techniques including that discussed in Japanese Patent Application Laid-Open No. 2011-31580. In Japanese Patent Application Laid-Open No. 2011-31580, the print processing time is estimated based on the type and a rendering area of objects (such as figures, characters, and images) in the print data.

Nevertheless, the conventional estimation for the print processing time does not take into consideration whether objects actually overlap with each other, which could largely affect the print processing time.

SUMMARY OF THE INVENTION

In view of the above, the present invention is directed to a method of estimating print processing time in consideration of whether objects overlap with each other.

According to an aspect of the present invention, an image processing apparatus for obtaining information to be used for estimating a rendering time of a page, includes a memory storing a program, and one or more processors which execute the program, the one or more processors controlling the image processing apparatus to function as a generation unit configured to generate, based on information on a shape of an object in the page, an object of a predetermined shape obtained by simplifying the shape of the object, for at least one of a plurality of objects in the page, a determination unit configured to determine overlap between at least two objects of the predetermined shape generated by the generation unit, and an obtaining unit configured to obtain the information to be used for estimating the rendering time based on the determined overlap.

Further features of the present invention will become apparent from the following description of exemplary embodiments with reference to the attached drawings.

BRIEF DESCRIPTION OF THE DRAWINGS

FIG. 10 is a flowchart illustrating cluster generation processing according to a second exemplary embodiment.

FIGS. 11A to 11D are diagrams each illustrating a concept of cluster merging according to the second exemplary embodiment.

DESCRIPTION OF THE EMBODIMENTS

How print processing time is affected by overlap between objects will be described.

Print data includes various objects. The print processing time might vary depending on whether the objects overlap with each other. One example of a print processing method includes determining, when two objects overlap with each other, a final rendering color for the overlapping portion based on how the objects overlap with each other, and rendering the overlapping portion with the rendering color. When such a print processing method is employed, print processing time of two objects not overlapping with each other differs from print processing time of the same two objects overlapping with each other.

Possible methods of estimating the print processing time include the one in which whether objects overlap with each other is determined based on shapes of the objects, an estimation parameter in consideration with overlap between objects is obtained based on the determination result, and the print processing time is estimated using the estimation parameter.

This concept makes way for one exemplary embodiment where whether the objects overlap with each other is accurately determined based on a detailed shape of each object. However, this processing of determining whether the objects overlap with each other requires processing of obtaining a detailed shape of each object, and thus takes time.

In view of the above, in the present exemplary embodiment, a quick and efficient method for determining whether the objects overlap with each other without processing of obtaining a detailed shape of each object will be described below.

An image processing apparatus according to the present exemplary embodiment is described below with reference to the drawings.

Figure 1:
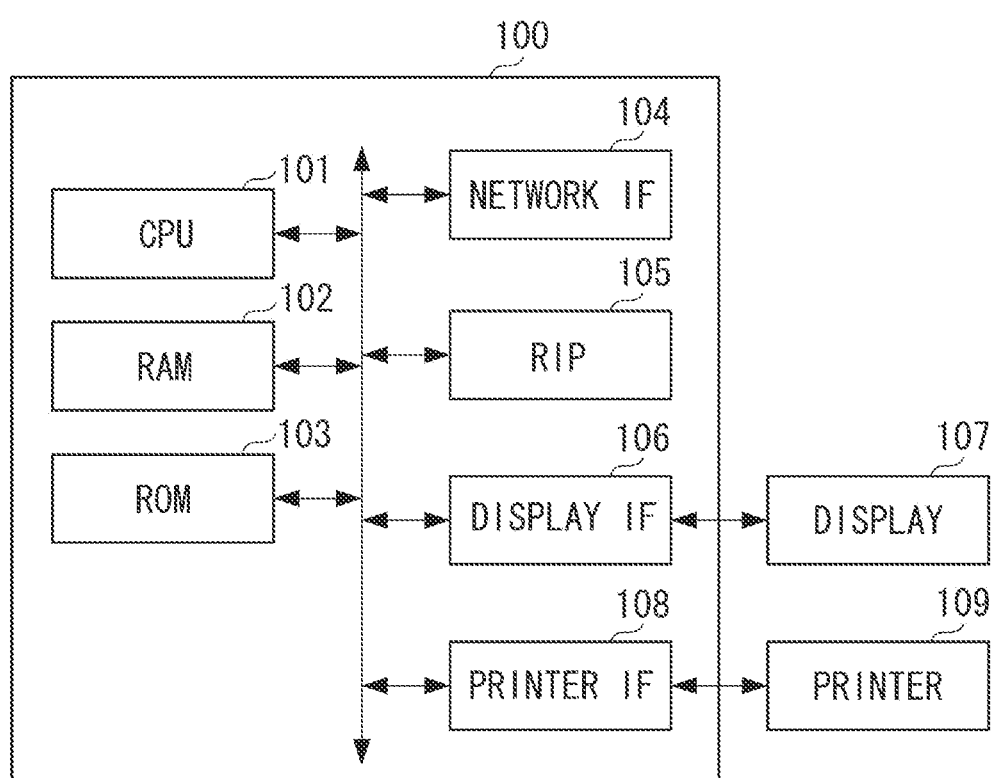
FIG. 1 is a diagram illustrating an example of a hardware configuration of an apparatus according to a first exemplary embodiment.

FIG. 1 is a block diagram illustrating an example of a hardware configuration of a multi function peripheral (MFP) 100 serving as the image processing apparatus according to the present exemplary embodiment.

The MFP 100 includes a central processing unit (CPU) 101 serving as a processor that controls the entire MFP 100, a random access memory (RAM) 102, a read only memory (ROM) 103, a network interface (IF) 104, a raster image processor (RIP) 105, a display IF 106, a display 107, a printer IF 108, and a printer 109. The ROM 103 stores therein software 200 illustrated in FIG. 2 that is executed by the CPU 101 with the RAM 102. Thus, the CPU 101 functions as each module (described below) in FIG. 2 that executes corresponding processing (for example, processing of generating intermediate data from print data) according to the present exemplary embodiment. The network IF 104 is an interface that communicates with an external apparatus (such as a personal computer (PC) and other MFPs) through a network, and is mainly in charge of receiving print data. The RIP 105 is an application specific integrated circuit (ASIC) that generates bitmap image data, output to a printer engine, from the intermediate data as described below.

The display IF 106 is a display control unit that transmits image data representing information to a display 107 such as a liquid crystal display (LCD) so that the information is displayed. For example, the information includes an estimation value indicating estimated time required for print processing according to the present exemplary embodiment information. The display 107 displays the information on a screen based on the image data thus received.

The printer IF 108 converts the bitmap image data, generated by the RIP 105, into data in a format receivable by the printer 109, and transmits the resultant data to the printer 109. The printer 109 prints an image on a sheet based on the data thus received.

The print data is hereinafter described as page description language (PDL) data. The PDL data is generated in a host PC (not illustrated) outside the MFP 100. The host PC transmits the PDL data to the MFP 100 via a local area network (LAN). According to the present exemplary embodiment, the MFP 100 executes processing of estimating time required for printing the PDL data received from the host PC. The PDL data as a subject of the estimation is not necessarily received from the external apparatus, and may be stored in the RAM 102 of the MFP 100.

Figure 2:
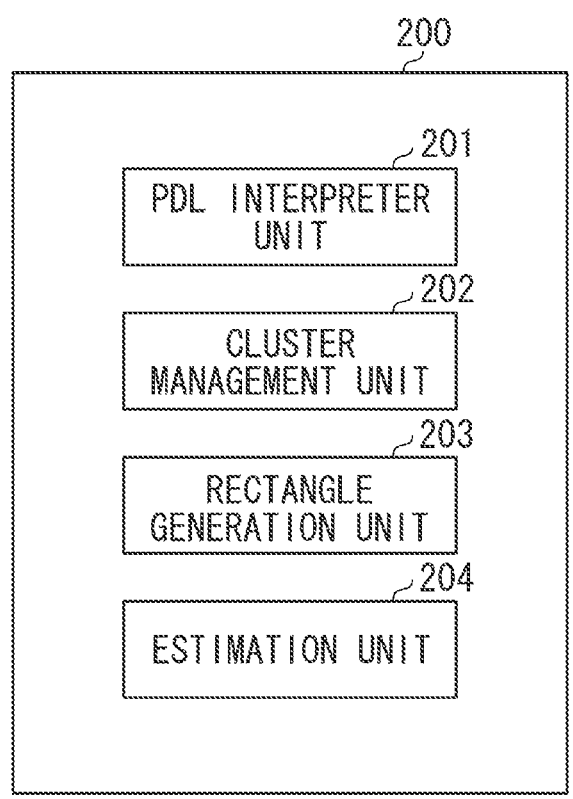
FIG. 2 is a diagram illustrating an example of a software module configuration of the apparatus according to the first exemplary embodiment.

FIG. 2 is a diagram illustrating an example of a configuration of the software 200. The software 200 includes four software modules that each operate on the CPU 101.

Figure 13A:
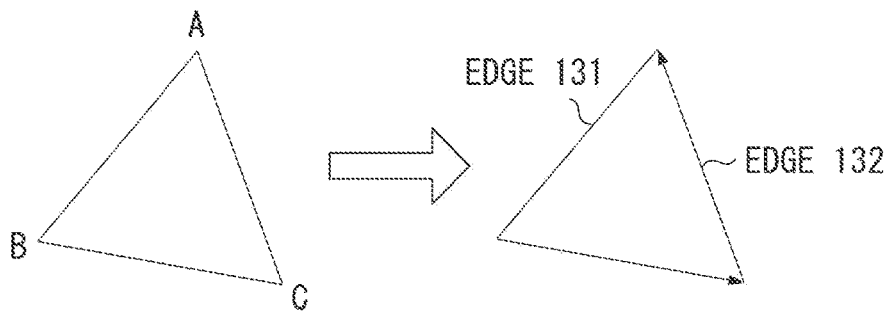
FIGS. 13A to 13C are diagrams illustrating spans.

A PDL interpreter unit 201 stores the PDL data received through the network IF 104 in the RAM 102. Then, the PDL interpreter unit 201 reads out and interprets a rendering command of an object in the PDL data stored in the RAM 102. A shape and a rendering position (hereinafter, simply referred to as a position) of an object as a rendering target is determined based on the rendering command. Thus, intermediate data indicating the shape and the position of the object is generated. The intermediate data of an object includes three types of data that are a plurality of pieces of vector data (edge) representing a contour of the object, a level of the object determined based on the Z-order, and fills indicating colors of the object. For example, the intermediate data generated by the PDL interpreter unit 201 for an object illustrated in FIG. 13A, which is a triangle having apices A, B, and C, indicates a vector (edge 131) representing the left side contour that extends from the apex A to the apex C via the apex B and a vector (edge 132) representing the right side contour that extends from the apex C to the apex A. The RIP 105 generates bitmap image data in the following manner from the intermediate data thus generated.

The RIP 105 identifies a scanline for generating image data. The RIP 105 according to the present exemplary embodiment stores therein in advance a frame buffer for generating bitmap image data representing a single page. The RIP 105 writes pixels, with a determined rendering color, to the frame buffer, and thus generates the bitmap image data of a single page. In an example illustrated in FIG. 13B, a triangular object on a scanline is rendered. The RIP 105 determines a span, defined by the edges 131 and 132 indicated by the intermediate data of the triangular object, on the scanline. In the example illustrated in FIG. 13B, the triangular object is the only object related to the rendering for this span. Thus, the rendering color of the span is determined to be the color of the triangular object. Thus, the pixels with the rendering color thus determined are written into a position corresponding to the span in the frame buffer.

Figure 13B:
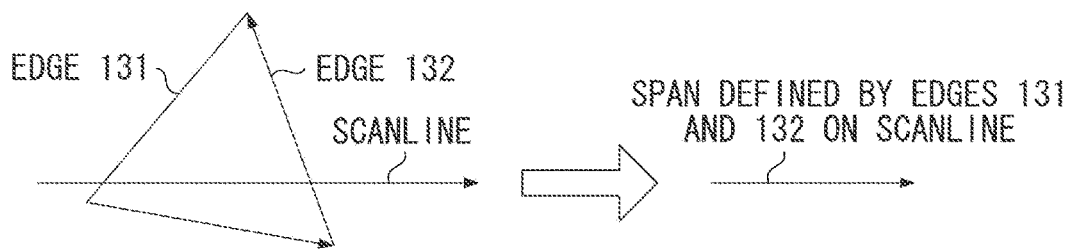
Figure 13C:
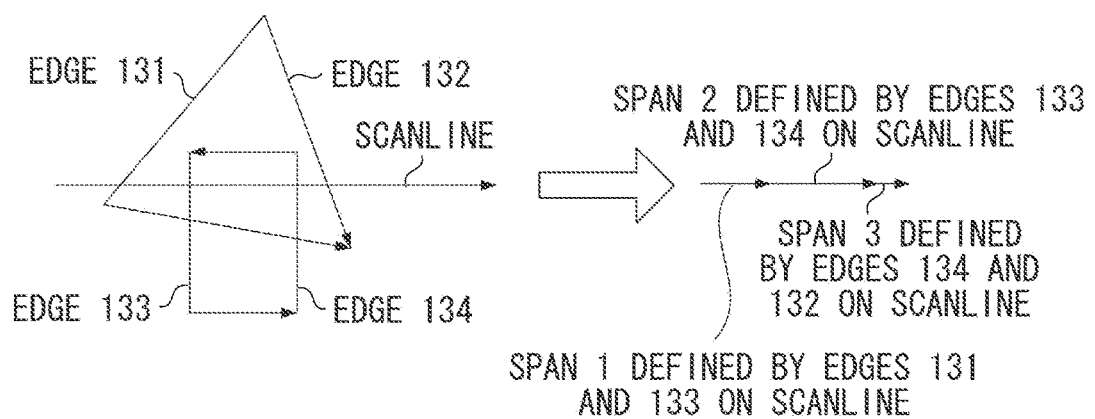

In an example illustrated in FIG. 13C, the triangular object and a rectangular object are on the scanline, and overlap with each other. Here, the RIP 105 renders the objects on the scanline through the following processing. More specifically, the RIP 105 determines three spans on the scanline. A first span (span 1) on the scanline is defined by the edge 131 of the triangular object and an edge 133 of a rectangular object. A second span (span 2) on the scanline is defined by the edge 133 of the rectangular object and an edge 134 of the rectangular object. A third span (span 3) on the scanline is defined by the edge 134 of the rectangular object and the edge 132 of the triangular object. As described above, in the example illustrated in FIG. 13C, the two objects overlap with each other, and the plurality of spans is determined in accordance with the contours of the objects. Since the above described processing of determining the spans requires to take into account the shapes and overlap between objects, a large amount of calculation processing is required.

The RIP 105 determines the rendering color of each of the spans 1 and 3, to each of which only a single object contributes, to be the color of the contributing object, as in the case of the FIG. 13B. Meanwhile, the RIP 105 determines the rendering color of the span 2, where the two objects overlap with each other, based on the level of each of the two objects (an overlapping manner of the objects determined by the Z order). For example, when the rectangular object overlapping on the triangular object is semi-transparent, the RIP 105 determines the rendering color of the span 2, by referring to the two objects (or their color information). Then, the RIP 105 identifies an overlapping manner of the rectangular object and the triangular object (which one is on top of the other). The RIP 105 determines a color, which is a combination between the color of the rectangular object and the color of the triangular object, to be the rendering color of the span 2. When the rectangular object overlapping the triangular object is opaque, the RIP 105 determines the color of the rectangular object on the upper level to be the rendering color of the span 2 in the same manner. The RIP 105 writes the pixels with the rendering color thus eventually determined to the position corresponding to the span in the frame buffer.

The processing (rendering processing) of generating the image data by the RIP 105 from the intermediate data generated by the PDL interpreter unit 201 is as described above.

Since the above described processing for determining the rendering color of each span in the rendering processing requires to take into account the overlap between objects, a large amount of calculation as is required. More specifically, the determination of the rendering color for a single span requires the following types of time. A first type of time is required for identifying one or more objects (or its color information) involved in the rendering of the span (referred to as span processing time). A second type of time is required for sorting the one or more objects thus identified based on their Z-order (referred to as level sort time). According to the present exemplary embodiment, the print processing time is estimated based on the span processing time and the level sort time.

The modules of the software 200 illustrated FIG. 2 are further described.

A cluster management unit 202 uses the intermediate data of an object generated by the PDL interpreter unit 201 to generate an object of a predetermined shape, which is a simplified version of the contour of the object. More specifically, the cluster management unit 202 converts the intermediate data of the object into data of another object having the predetermined shape, based on the position and the shape of the object. For example, for the triangular object described above, the cluster management unit 202 sets a bounding rectangle containing the coordinates of each apex of the triangle as the predetermined shape that is a simplified version of the triangular shape. Thus, the cluster management unit 202 generates an object of the predetermined shape. The object of the predetermined shape (hereinafter, referred to as a cluster) includes three types of information, described with reference to FIG. 3, as information on the object.

Figure 3:
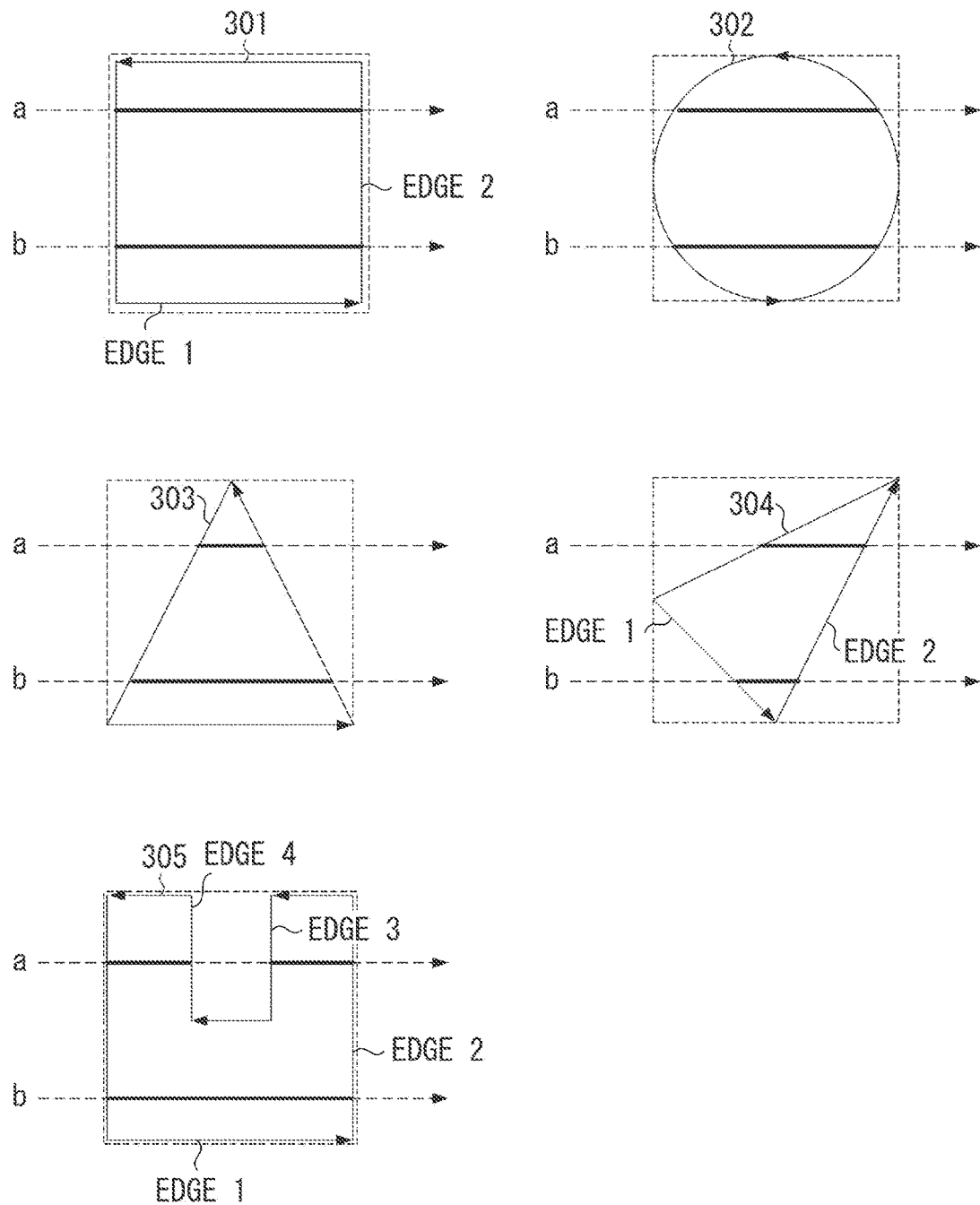
FIG. 3 is a diagram illustrating examples of an object according to the first exemplary embodiment.

FIG. 3 illustrates intermediate data of five objects with different shapes. An object 301 is a square object with horizontal upper and lower bases. An object 302 is a perfect circular object. An object 303 is an equilateral triangular object with a horizontal base. An object 304 is an isosceles triangular object with apices at the upper right apex, a midpoint of the left side, and a midpoint of the base of the square shape. An object 305 is a rectangular U shaped object as a square shape provided with a recess recessed from two points, dividing the upper base of the square shape in three, to half the length of the side of the square. The contours of the objects are represented by edges.

The five objects each have the following number of spans on two scanlines a and b in FIG. 3. In FIG. 3, dotted line arrows represent the scanlines a and b and thick solid lines represent the spans. Each of the objects 301, 302, 303, and 304 has a single span on the scanline a and a single span on the scanline b. The object 305 has two spans on the scanline a and a single span on the scanline b. Thus, the number of spans of the object differs among the shapes.

The cluster has the following three types of information. How each type of information is used is described below.

1. Bounding Box

Figure 8:
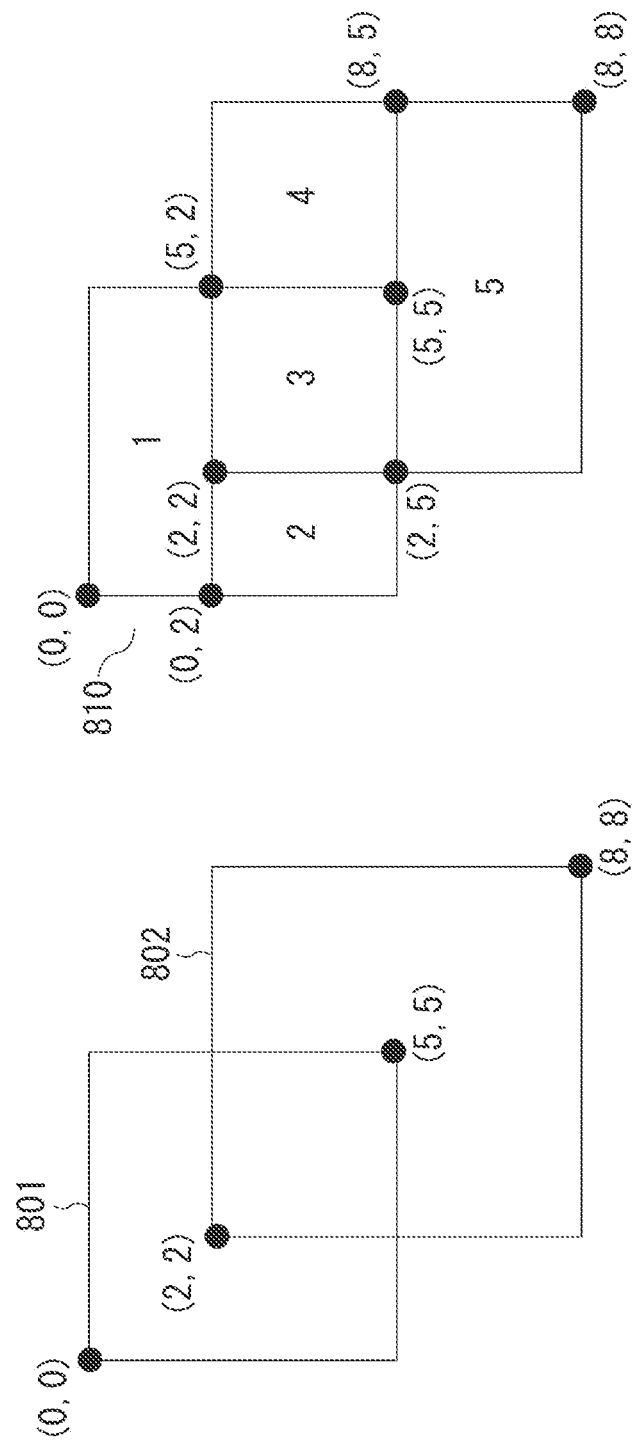
FIG. 8 is a diagram illustrating rectangle segments.

First type of information is information on the rectangle (bounding box) containing the contour of an object. According to the present exemplary embodiment, coordinate positions of upper left and lower right points of the bounding box are used as information indicating the position and a range of a cluster. The coordinate positions are determined based on the position (rendering position) and the shape (rendering range) of an original object. The rectangle is used for the following reasons (1) to (3). As for Reason (1), the rectangle is a simple shape that can be represented by the upper left point and the lower right point, and thus is an object shape that can be obtained much faster than obtaining a detailed shape of the object for determining whether objects overlap. As for Reason (2), an overlapping area between objects having simple rectangular shapes can be recognized much faster than recognizing the overlapping area between the detailed shapes of the objects. For example, whether rectangles 1 and 2 overlap with each other is determined as follows. More specifically, coordinates of each apex of the rectangle 2 are obtained, and whether an area of the rectangle 1 includes any one of the apices of the rectangle 2 is determined. The rectangles 1 and 2 are determined to overlap with each other, when the area includes at least one apex. As for Reason (3), an operation of segmenting a cluster described below can be easily performed with the rectangular shape. For example, when two rectangles overlap with each other as illustrated in FIG. 8, coordinates of the upper left point and the lower right point representing each of five rectangle segments can be easily obtained based on the coordinates of the upper left point and the lower right point of each of the two rectangles before the segmentation, instead of obtaining the contour of the two rectangles before the segmentation.

The rectangle containing the contour of an object is an example of the predetermined shape. The predetermined shape is not limited to the rectangle and may be any shape with which estimation parameters for the print processing time described below can easily be obtained.

2. Density Per Pixel

Second type of information is information (hereinafter, referred to as a density per pixel) indicating the number of objects in a target bounding box. The density per pixel is information (index) indicating the average number of objects per pixel in the bounding box of the object. The density per pixel is determined based on the shape of an object and is calculated with the following Formula, density per pixel=(area of object)/(area of bounding box).

The density per pixel of the cluster of the object 301 in the example illustrated in FIG. 3 is "1" because a rectangular object in the bounding box, indicated by a dotted line, has the same area as the bounding box. The density per pixel of the object 302 is "0.785"=area of perfect circle/area of bounding rectangle. The objects 303, 304, 305 respectively have densities per pixel of "0.5", "0.475", and "0.833" calculated in the manner described above.

3. Average Number of Spans

Third information is the average number of spans (hereinafter, referred to as span per line (SPL)). The SPL is information (index) indicating the average number of spans of an object in a single scanline in the bounding box of the object. The SPL is determined based on the shape of an object, and is calculated by the following Formula, SPL=(sum of absolute values of $y$ displacement of contour of object)/2/(height of bounding box)

The y displacement of a contour of an object is described with the objects 301, 304, and 305 in FIG. 3 as examples. The displacement of the contour of an object in a y direction (vertical direction in the figure) can be obtained from each of a plurality of edges, in the intermediate data of the object, as vector data representing the contour of the object. For example, the absolute value of the displacement of each edge (edges 1 and 2) in the y direction is equal to the height of the bounding box for the object 301. The sum of the absolute values of the y displacement of the contour of the object is the sum of the absolute values of the displacement of the edges in the y direction. Thus, the SPL is calculated as 1.0 with the sum of the absolute values of the y displacement of the contour of the object being twice as large as the height of the bounding box. Similarly, the absolute value of the displacement of each of the edges (edges 1 and 2) of the object 304 in the y direction is the same as the height of the bounding box. Thus, the SPL calculated for the object 304 is 1.0. The objects 301 and 304 are different from each other in shape, but has the same SPL. Thus, the number of spans (single span) in each scanline is the same between the bounding boxes of the objects 301 and 304.

The SPL is calculated differently for the object 305. The intermediate data of the object 305 includes four edges. The absolute value of the displacement in the y direction of each of the edges 1 and 2 is the same as the height of the bounding box. On the other hand, the absolute value of the displacement in the y direction of each of edges 3 and 4 is half the height of the bounding box. Thus, the SPL is calculated as 1.5 for the object 305. Thus, the average number of spans per scanline in the bounding box of the object 305 having the rectangular U shape is 1.5.

When the height of the bounding box is defined as 1, the cluster management unit 202 calculates 1.0 as the SPL of the object 301 with the sum of the absolute values of the y displacement of the contour being 2. Similarly, the cluster management unit 202 respectively calculates 1.0, 1.0, and 1.0 as the SPLs of the objects 302 to 304.

The cluster management unit 202 can execute processing of merging clusters, described below, for reducing the number of clusters.

A rectangle generation unit 203 determines overlap between clusters generated by the cluster management unit 202, and divides (segmenting) the clusters based on the result of the determination to generate segmented clusters (rectangle segments). According to the present exemplary embodiment, the bounding box (rectangle) represents the shape of the cluster so that the overlap between the clusters can be determined much faster than in a case where the overlap between objects is determined by calculating the contour of each object from edges. Furthermore, the dividing for obtaining the rectangle segments can be performed quickly.

The rectangle generation unit 203 calculates the density per pixel and the SPL again for each of the rectangle segments obtained by the dividing, in a manner described below.

An estimation unit 204 estimates the print processing time by obtaining a plurality of types of estimation parameters required for estimating the print processing time, and by multiplying each estimation parameter by a coefficient determined in advance for a corresponding estimation parameter. The print processing time is estimated by the following Formula (1), $$(\text{Print processing time}) = \sum_{i=0}^{M} (p(i) \times x(i)) + C, \quad (1)$$

where M represents the total number of estimation parameters to be acquired, i represents the type of estimation parameter, p(i) represents an estimation parameter corresponding to the index i, x(i) represents a coefficient corresponding to the index i, and C represents a constant. The coefficient x(i) and the constant C are determined based on the performances of the RIP 105 and the printer 109. Information (estimated value) indicating the print processing time thus estimated is displayed on the display 107.

The estimation parameters obtained by the estimation unit 204 include an estimation parameter indicating the number of edges obtained as follows for example. The estimation unit 204 interprets a single page of the intermediate data generated by the PDL interpreter unit 201, and counts up the number of edges from 0. In the example illustrated in FIG. 3, the number of edges are counted up to two for each of the objects 301 and 304, and is counted up to four for the object 305. The number of edges can be the estimation parameter because the time required for the processing for generating (forming) the spans in the print processing increases with the total number of edges (count up result) in a single page.

The estimation parameter further includes a parameter related to overlap between objects (overlap parameter). The estimation unit 204 estimates the actual number of spans and the number of overlapping objects, based on each information (the bounding box, the density per pixel, and the SPL) related to the rectangle segment generated by the rectangle generation unit 203. Then, the estimation unit 204 calculates the overlap parameter based on the number of spans and overlapping objects thus estimated, in a manner described below.

<Calculation of Overlap Parameter>

Figure 4:
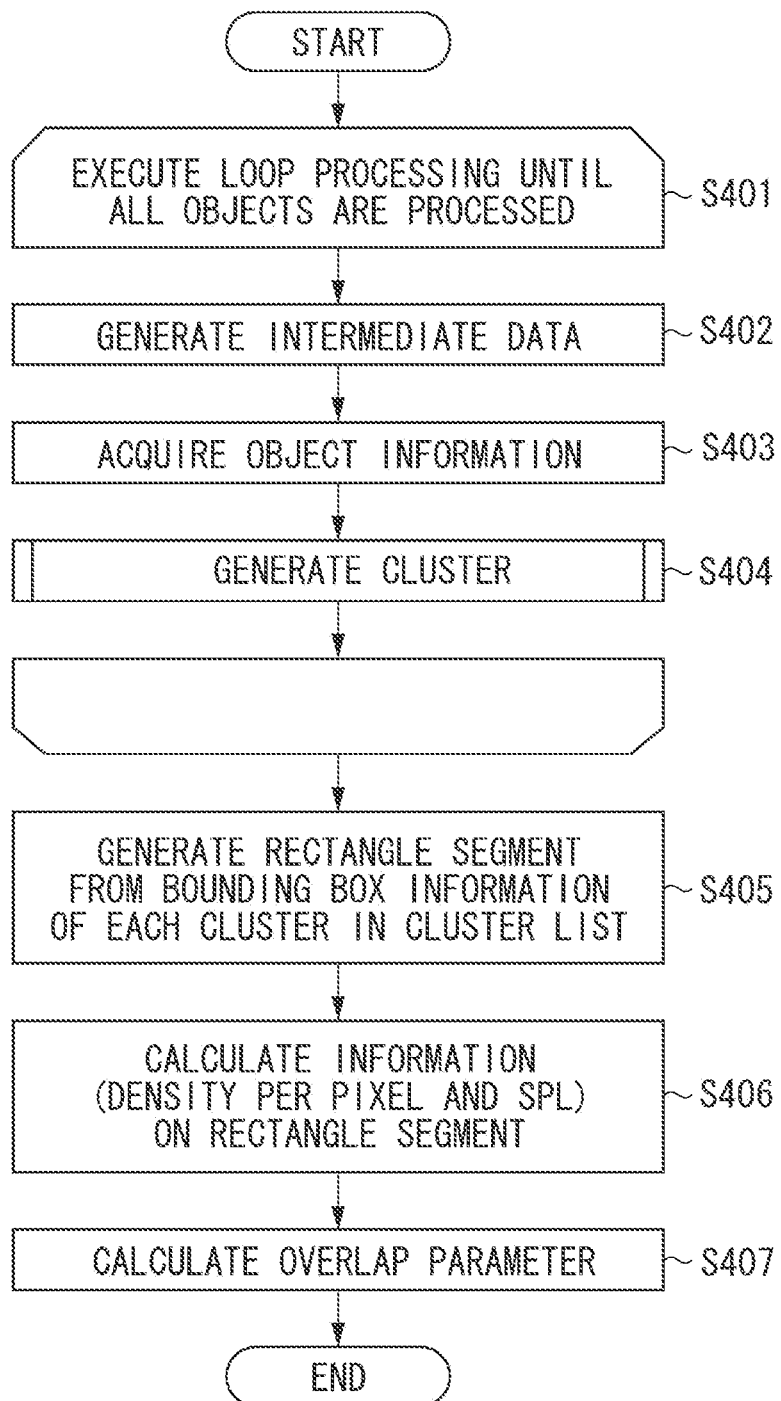
FIG. 4 is a flowchart illustrating an example of processing of calculating an overlap parameter according to the first exemplary embodiment.

Next, a method of calculating the overlap parameter will be described with reference to a flowchart in FIG. 4. FIG. 4 is a flowchart illustrating an example of processing executed by the software 200. Processing in the flowcharts described below is implemented by the CPU 101 by executing a program stored in the ROM 103. This flowchart corresponds to processing for a single page for the sake of description, and starts when the PDL data is received and stored in the RAM 102 by the network IF 104.

In step S401, the PDL interpreter unit 201 starts loop processing, including processing in steps S402 to S404, repeated until all the rendering commands in a single page in the PDL data stored in the RAM 102 are read.

In step S402, the PDL interpreter unit 201 reads out and interprets a rendering command of a single object in the stored PDL data, to generate the intermediate data of the object.

In step S403, the PDL interpreter unit 201 acquires object information from the intermediate data generated in step S402. The object information is information specified to an object, and includes the position/type of the edges defining the object, a combining operator (a blend and Rendering Output Pipeline (ROP)), and the like.

In step S404, the cluster management unit 202 generates a cluster based on the object information acquired in step S403.

Figure 5:
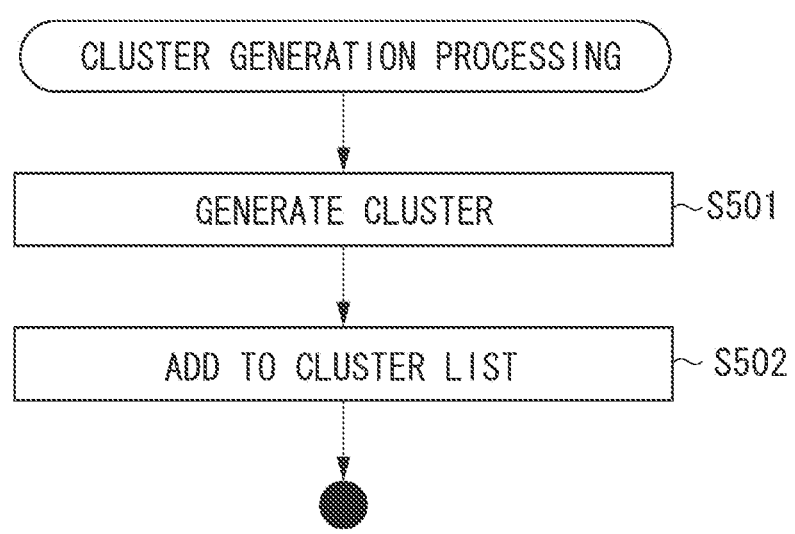
FIG. 5 is a flowchart illustrating cluster generation processing according to the first exemplary embodiment.

The cluster generation processing in step S404 is described in detail with reference to a flowchart in FIG. 5.

In step S501, the cluster management unit 202 generates a cluster including the three types of information described above.

Figure 6:
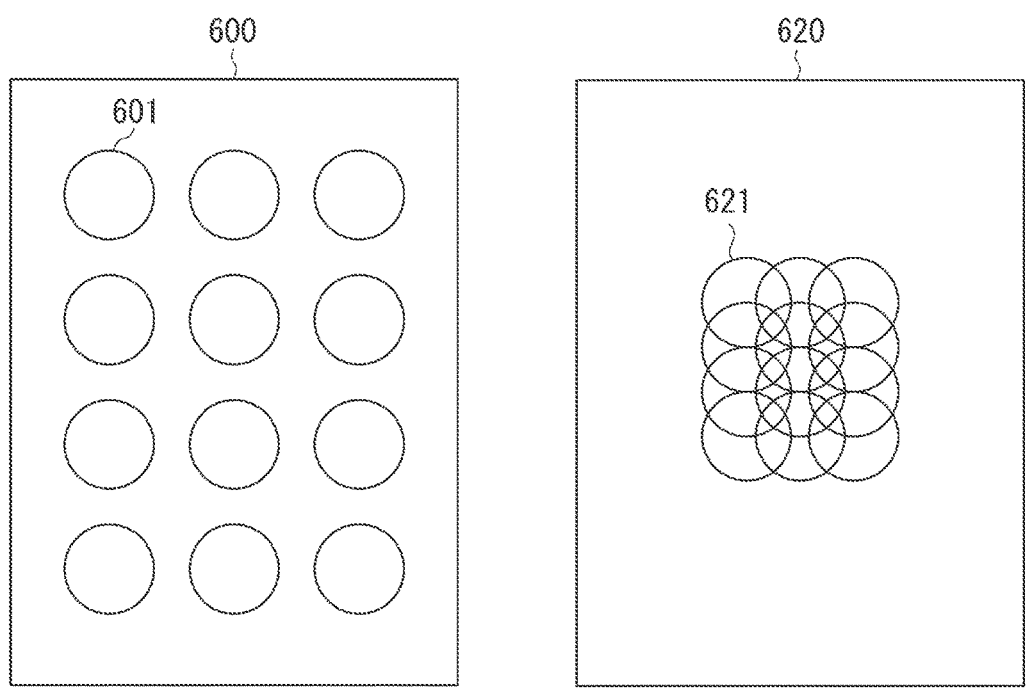
FIG. 6 is a diagram illustrating examples of pages including objects.

The cluster thus generated is described with reference to an example illustrated in FIG. 6. A page 600 in FIG. 6 includes a plurality of objects 601, each having a perfect circle shape, not overlapping with each other. A page 620 includes objects 621 that are the same as the objects 601 and overlap with each other. The number of objects 621 is the same as the number of objects 601 in the page 600. The print processing for the page 620 involves the span processing and the level sorting, and thus takes longer time than that for the page 600. The present exemplary embodiment employs the concept of the cluster and the rectangle segment described below, to obtain the estimation parameters with which the print processing time can be accurately estimated in consideration of whether objects overlap with each other.

The cluster management unit 202 generates a cluster including the following information from the intermediate data on a single object 601, bounding box={(300,400),(800,900)}, Density per pixel=(250×250×π)/(500×500)=0.785, and

SPL=(500+500)/2/(500)=1.0.

The information on the object 601 is converted into information, in the cluster generated, indicating that an average number of objects in each pixel is 0.785 and that an average number of spans on each scan line is 1.0, in the rectangle as the bounding box={(300,400), (800,900)}. When a single cluster corresponds to a single object, the cluster is generated for converting information on the object having a complex shape into an object with a simple predetermined shape having an equivalent amount of information, in terms of the overlap between objects with the complex shapes.

Figure 7:
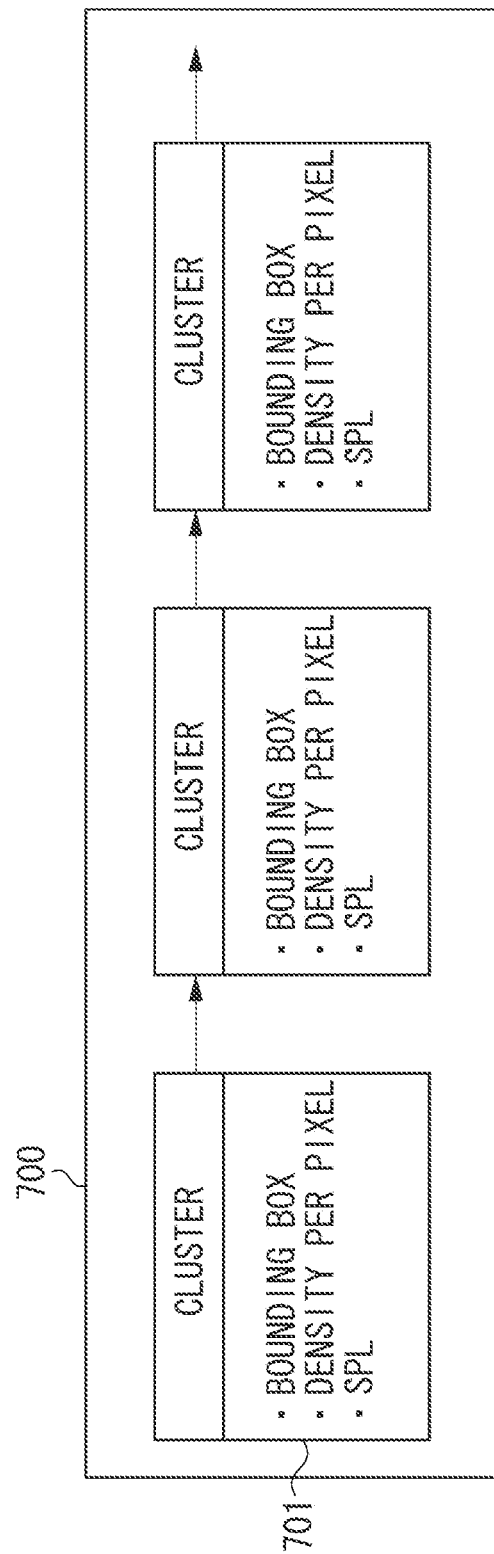
FIG. 7 is a diagram illustrating an example of a configuration of a cluster list.

In step S502, the cluster management unit 202 adds the cluster, corresponding to a single object, generated in step S501 to a cluster list. The cluster list is stored in the RAM 102, and is managed with a non-branched list structure illustrated in FIG. 7. Thus, a newly added cluster is connected to a cluster at the end of the list. Thus, when clusters are generated for the page 600, a generated cluster list has 12 clusters connected to each other.

Through the processing from step S401 to S404 described above, all the objects in the page is converted into clusters and managed in the form of the cluster list.

The flowchart in FIG. 4 is further described.

Processing executed in step S405 to S407 is described below. The Overlap between clusters (objects having the predetermined shape) generated in step S404 is determined based on the bounding box information of each cluster, and a plurality of rectangle segments in consideration of the overlap between clusters is generated. Information for obtaining the overlap parameter in consideration of the overlap between objects is calculated for each rectangle segment, and the overlap parameter is calculated from the information thus calculated.

In step S405, the rectangle generation unit 203 determines whether each cluster in the cluster list overlaps with another cluster, based on the bounding box information of the clusters. The bounding box of a cluster overlapping with none of the other clusters is directly used as a rectangle segment. On the other hand, the bounding box of the cluster overlapping with another cluster is divided into a plurality of rectangle segments based on the bounding box information of the overlapping clusters. Each of the rectangle segments thus obtained has the bounding box information indicating its position, as in the case of the cluster.

This processing is described with FIG. 8 as an example where the cluster list only includes clusters 801 and 802. Information on the cluster 801 illustrated in FIG. 8 includes bounding box={(0,0), (5,5)}, density per pixel=1.0, and SPL=1.0. Information on the cluster 802 includes bounding box={(2,2), (8,8)}, density per pixel=0.5, and SPL=1.0. A rectangle segment group 810 represents a result of dividing the bounding boxes of the clusters 801 and 802 into a plurality of rectangle segments (rectangle segments 1 to 5).

The rectangle generation unit 203 refers to the bounding box information of the clusters 801 and 802 in the cluster list to determine whether bounding boxes overlap with each other. In this example, the rectangle generation unit 203 determines that the bounding boxes of the clusters 801 and 802 overlap with each other. This overlap determination, performed by referring to the bounding box information (that is, the upper left point and the lower right point), can be performed faster than the overlap determination performed by obtaining the contours of objects from the edges of the original objects. Next, the rectangle generation unit 203 identifies the rectangle segment as the overlapping portion, which is the rectangle segment 3 in the example illustrated in FIG. 8. The rectangle segment 3 has bounding box information={(2,2), (5,5)}. The rectangle generation unit 203 divides non-overlapping portions into a plurality of rectangle segments, whereby the rectangle segments 1, 2, 4, and 5 are obtained in the example in FIG. 8. The rectangle segment 1 has bounding box information={(0,0), (5,2)}, the rectangle segment 2 has bounding box information={(0,2), (2,5)}, the rectangle segment 4 has bounding box information={(5,2), (8,5)}, and the rectangle segment 5 has bounding box information={(2,5), (8,8)}.

This way of dividing the bounding boxes is merely an example, and the bounding boxes of the clusters may be divided in any other way as long as objects of the predetermined shape can be obtained in the same manner as that for generating the cluster from the intermediate data.

In step S406, the rectangle generation unit 203 calculates the density per pixel and the SPL for each of the plurality of rectangle segments obtained by the dividing, based on the detected overlap (the position and the range of the overlapping portion). This calculation is performed for an object that is the same as that of the calculation for obtaining the density per pixel and the SPL of the cluster. More specifically, the calculation is performed to roughly recognize how the objects overlap in the rectangle segment. The density per pixel of the rectangle segment indicates the average number of objects in each pixel in the rectangle segment. The SPL of the rectangle segment indicates the average number of spans on each scanline in the rectangle segment.

Thus, the density per pixel of the rectangle segment is obtained as the sum of densities per pixel of the clusters including the rectangle segment. The SPL of the rectangle segment is determined to be a sum of values each obtained by multiplying the SPL of each cluster by the ratio of the width of the bounding box of the rectangle segment (rectangle segment width) to the width of the bounding box of the cluster (cluster width).

In a case where there is a cluster not being divided, the density per pixel and the SPL may be used without change.

In the example illustrated in FIG. 8, the rectangle segment 1 has $$\text{density per pixel}=(\text{density per pixel of cluster 801})=1.0, \text{ and}$$

$$\text{SPL}=(\text{SPL of cluster 801})\times\{(\text{width of rectangle segment 1})/(\text{width of cluster 801})\}=1.0\times\{5/5\}=1.0.$$

Thus, the rectangle segment 1 may be regarded as a portion in which the number of objects per pixel is one, and the number of spans on each scanline is 1.0.

The rectangle segment 2 has $$\text{density per pixel}=(\text{density per pixel of cluster 801})=1.0, \text{ and}$$

$$\text{SPL}=(\text{SPL of cluster 801})\times\{(\text{width of rectangle segment 2})/(\text{width of cluster 801})\}=1.0\times\{2/5\}=0.2.$$

Thus, the rectangle segment 2 may be regarded as a portion in which the number of objects per pixel is one, and the number of spans on each scanline is 0.2.

The rectangle segment 3 has $$\text{density per pixel}=(\text{density per pixel of cluster 801})+(\text{density per pixel of cluster 802})=1.0+0.5=1.5, \text{ and}$$

$$\text{SPL}=(\text{SPL of cluster 801})\times\{(\text{width of rectangle segment 3})/(\text{width of cluster 801})\}+(\text{SPL of cluster 802})\times\{(\text{width of rectangle segment 3})/(\text{width of cluster 802})\}=1.0\times\{3/5\}+1.0\times\{3/6\}=1.1.$$

Thus, the rectangle segment 3 may be regarded as a portion in which the number of objects per pixel is 1.1, and the number of spans on each scanline is 1.1.

The density per pixel and the SPL of each of the rectangle segments 4 and 5 are obtained as in the same manner as that for a corresponding one of the rectangle segments 1 and 2.

In step S406, the rectangle generation unit 203 obtains the density per pixel and the SPL of each rectangle segment, as in the example described above with reference to FIG. 8.

Figure 9:
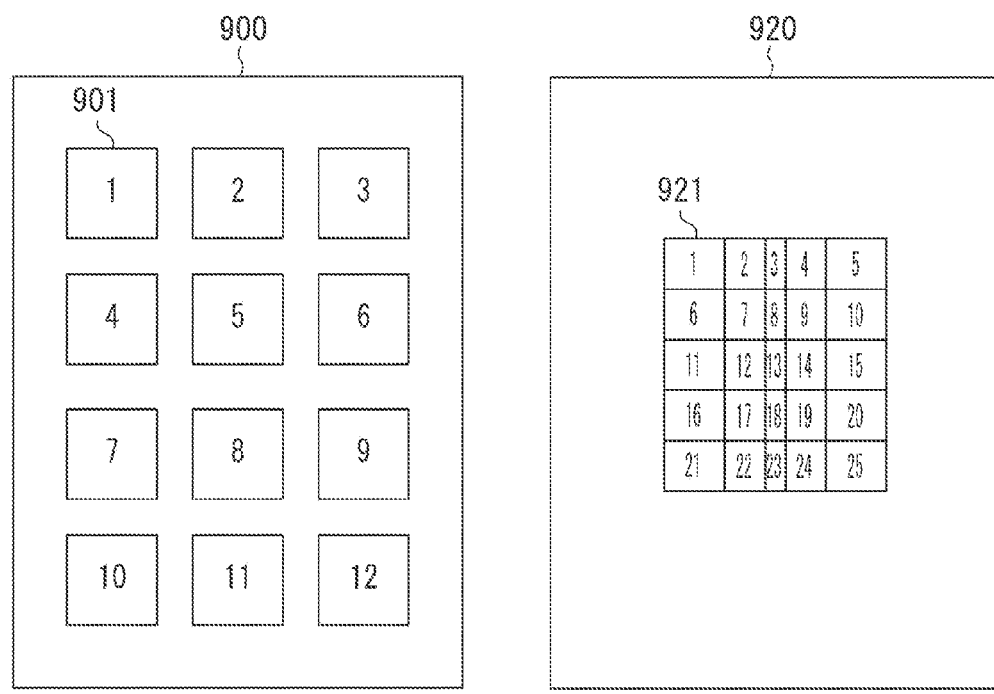
FIG. 9 is a diagram illustrating clusters representing the pages illustrated in FIG. 6.

FIG. 9 illustrates pages 900 and 920 representing results of executing the processing in steps S405 and S406 on the pages 600 and 602. Each rectangle in the pages 900 and 920 represents a single rectangle segment. The rectangles are each denoted with a number therein for identifying each rectangle segment, for the sake of description. More specifically, 12 rectangle segments are generated from the page 600, and 25 rectangle segments are generated from the page 620. The density per pixel and the SPL are obtained for each of these rectangle segment.

Next, in step S407, the estimation unit 204 calculates the overlap parameter based on the bounding box information, the density per pixel, and the SPL of each of the rectangle segments generated in step S405. The overlap parameter serves as one of the estimation parameters in the formula for estimating the print processing time described above.

The estimation unit 204 obtains a result of multiplying the SPL by the height for a corresponding rectangle segment, as an estimation value of the number of spans in the rectangle segment. The density per pixel can be regarded as the number of overlapping objects per pixel. Therefore, a result of multiplying the density per pixel by the estimated number of spans serves as an index of a sum of time required for identifying one or more objects (or their color information) contributing to each span in the area of the rectangle segment. The index of the span processing time for all the rectangle segments is calculated by the following formula, $$(\text{Span processing time index}) = \sum_{i=0}^{N} \text{density per pixel}(i) \times \text{span}(i), \quad (2)$$

where N represents the total number of rectangle segments, density per pixel(i) represents the density per pixel of an ith rectangle segment, and span(i) represents the number of spans in the ith rectangle segment.

One or more objects (or its color information) contributing to a single span are sorted based on their Z-order for determining the rendering color for the span. The time required for sorting (level sorting) is approximately proportional to the square of the number of overlapping objects. An index of the time required for the estimation unit 204 to perform the level sorting for all the rectangle segments is calculated by the following formula, $$(\text{Level sort time index}) = \sum_{i=0}^{N} (\text{density per pixel}(i))^2 \times \text{span}(i). \quad (3)$$

With this formula, for example, the span processing time index=4716, the level sorting time index=3696 are obtained for the page 900 illustrated in FIG. 9, as shown in Table 1 below. The span processing time index=12325, the level sorting time index=30745 are obtained for the page 920, as shown in Table 2 below. A larger numerical value indicates a longer processing time. Thus, according to the present exemplary embodiment, accurate estimation parameters in consideration of the overlap between objects on each span, can be obtained for estimating the print processing time for the pages 600 and 620 in FIG. 6.

TABLE 1

| Rectangle No. | Density per pixel | SPL | Height of rectangle | Number of spans | Span processing time index | Level sort time index |
|---|---|---|---|---|---|---|
| 1 | 0.785 | 1 | 500 | 500 | 393 | 308 |
| 2 | 0.785 | 1 | 500 | 500 | 393 | 308 |
| 3 | 0.785 | 1 | 500 | 500 | 393 | 308 |
| 4 | 0.785 | 1 | 500 | 500 | 393 | 308 |
| 5 | 0.785 | 1 | 500 | 500 | 393 | 308 |
| 6 | 0.785 | 1 | 500 | 500 | 393 | 308 |
| 7 | 0.785 | 1 | 500 | 500 | 393 | 308 |
| 8 | 0.785 | 1 | 500 | 500 | 393 | 308 |
| 9 | 0.785 | 1 | 500 | 500 | 393 | 308 |
| 10 | 0.785 | 1 | 500 | 500 | 393 | 308 |
| 11 | 0.785 | 1 | 500 | 500 | 393 | 308 |
| 12 | 0.785 | 1 | 500 | 500 | 393 | 308 |
| TOTAL | | | | 6000 | 4716 | 3696 |

The overlap parameter (the span processing time index and the level sort time index) thus calculated in step S407 is used in the estimation formula described above, so that the print processing time in consideration of the overlap between objects can be estimated. For the example illustrated in FIGS. 6 and 9, the estimation parameters are used in the estimation formula, whereby accurate printing time close to the actual printing time can be estimated with the indices that change, between pages with the same number of objects with the same shapes, in accordance with an overlapping manner.

TABLE 2

| Rectangle No. | Density per pixel | SPL | Height of rectangle | Number of spans | Span processing time index | Level sort time index |
|---|---|---|---|---|---|---|
| 1 | 0.785 | 0.6 | 250 | 150 | 118 | 92 |
| 2 | 1.57 | 0.8 | 250 | 200 | 314 | 493 |
| 3 | 0.785 | 0.2 | 250 | 50 | 39 | 31 |
| 4 | 1.57 | 0.8 | 250 | 200 | 314 | 493 |
| 5 | 0.785 | 0.6 | 250 | 150 | 118 | 92 |
| 6 | 1.57 | 1.2 | 250 | 300 | 471 | 739 |
| 7 | 3.14 | 1.6 | 250 | 400 | 1256 | 3944 |
| 8 | 1.57 | 0.4 | 250 | 100 | 157 | 246 |
| 9 | 3.14 | 1.6 | 250 | 400 | 1256 | 3944 |
| 10 | 1.57 | 1.2 | 250 | 300 | 471 | 739 |
| 11 | 1.57 | 1.2 | 250 | 300 | 471 | 739 |
| 12 | 3.14 | 1.6 | 250 | 400 | 1256 | 3944 |
| 13 | 1.57 | 0.4 | 250 | 100 | 157 | 246 |
| 14 | 3.14 | 1.6 | 250 | 400 | 1256 | 3944 |
| 15 | 1.57 | 1.2 | 250 | 300 | 471 | 739 |
| 16 | 1.57 | 0.4 | 250 | 100 | 157 | 246 |
| 17 | 3.14 | 1.6 | 250 | 400 | 1256 | 3944 |
| 18 | 1.57 | 0.4 | 250 | 100 | 157 | 246 |
| 19 | 3.14 | 1.6 | 250 | 400 | 1256 | 3944 |
| 20 | 1.57 | 1.2 | 250 | 300 | 471 | 739 |
| 21 | 0.785 | 0.6 | 250 | 150 | 118 | 92 |
| 22 | 1.57 | 0.8 | 250 | 200 | 314 | 493 |
| 23 | 0.785 | 0.2 | 250 | 50 | 39 | 31 |
| 24 | 1.57 | 0.8 | 250 | 200 | 314 | 493 |
| 25 | 0.785 | 0.6 | 250 | 150 | 118 | 92 |
| TOTAL | | | | 5800 | 12325 | 30745 |

In the first exemplary embodiment, one cluster is generated for each object, and managed in the cluster list. In a second exemplary embodiment, when a cluster of the object is generated in step S404, a cluster that is highly relevant with the generated cluster is selected from the clusters that have been generated and managed in the cluster list, and is merged with the generated cluster. Thus, the number of clusters managed in the cluster list is regulated, whereby a memory resource of the RAM 102 for storing the cluster list can be saved and the time required for generating the rectangle segments in step S405 can be regulated.

The hardware configuration and the software configuration according to the present exemplary embodiment are the same as those in the first exemplary embodiment illustrated in FIGS. 1 and 2, and thus will not be described.

The present exemplary embodiment is characterized by the processing in step S404 in the flowchart illustrated in FIG. 4. More specifically, according to the present exemplary embodiment, processing in a flowchart illustrated in FIG. 10 is executed instead of the processing (FIG. 5) in step S404 in the first exemplary embodiment. The processing other than that in step S404 is the same as that in the first exemplary embodiment and thus will not be described.

The flowchart in FIG. 10 is described.

In step S501, the cluster management unit 202 generates a cluster of an object, in the same manner as that in the first exemplary embodiment.

Next, in step S1001, the cluster management unit 202 determines whether any one of clusters that have been managed in the cluster list is highly relevant to information of the generated cluster. When the cluster management unit 202 determines that the cluster list includes the cluster highly relevant with the generated cluster (YES in step S1001), the processing proceeds to step S1002. When the cluster management unit 202 determines that the cluster list includes no cluster highly relevant with the generated cluster (NO in step S1001), the processing proceeds to step S502 that is the same as that in the first exemplary embodiment.

The relevance between the clusters is determined based on how much the accuracy of the information of clusters will be degraded when the clusters are merged (degradation level). The clusters achieving the degradation level lower than a threshold are determined to be highly relevant clusters. The cluster management unit 202 calculates the degradation level after determining relationship between the clusters, which is one of the following two cases.

In the first case, the bounding box of the cluster generated is not included in a cluster in the cluster list. In this case, an amount of change in density per pixel before and after the clusters are merged may be used as the degradation level. The cluster management unit 202 does not perform the merging when the amount of change is equal to the threshold or more, and performs the merging when the amount of change is less than the threshold. The density per pixel after the merging is calculated by the following formula, $$\text{(Density per pixel after merging)} = \sum_{i=0}^{N} \text{density per pixel}(i) \times \text{area ratio}(i), \quad (4)$$

where N represents the number of clusters to be merged (two in this example), i represents the index of each cluster as the merging target, density per pixel (i) represents the density per pixel of a cluster (i), and area ratio (i) represents a ratio of an area of a bounding box of the cluster (i) to an area of the bounding rectangle (cluster obtained by the merging) that entirely includes the bounding boxes of the two clusters as the merging targets.

In the second case, the bounding box of the generated cluster is included in a cluster in the cluster list. In this case, the amount of change in the area ratio before and after the merging, regarding the area of the bounding box of the generated cluster, may be used as the degradation level. The cluster management unit 202 does not perform the merging when the area ratio is equal to the threshold or more, and performs the merging when the area ratio is not more than the threshold.

A specific example of a method of determining whether the relevance is high is described with reference to FIG. 11.

In FIG. 11A, a cluster 1101 has the bounding box={(0,0), (100,100)} and the density per pixel=1.0, and a cluster 1102 has the bounding box={(105,100), (205,100)} and the density per pixel=1.0. Thus, the clusters 1101 and 1102 are separated from each other by a distance of five pixels. In this example, the threshold of the amount of change in the density per pixel is 0.1.

When the two clusters 1101 and 1102 are merged, a resultant cluster 1103 is a large cluster including the two clusters 1101 and 1102. The information on the large cluster 1103 includes the bounding box={(0,0), (205,100)} and the density per pixel=1.0×(100/205)+1.0×10000/20500=0.98. The amount of change in the density per pixel as a result of the merging is the sum of the amount of changes from the clusters 1101 and 1102. More specifically, the amount of change is (1.0−0.98)+(1.0−0.98)=0.04. Thus, the amount of change in the density per pixel (degradation level) as a result of the merging is smaller than the threshold. Therefore, the two clusters 1101 and 1102 are determined to be highly relevant with each other, and thus are merged in step S1002.

In FIG. 11B, a cluster 1111 has the bounding box={(0,0), (100,100)} and the density per pixel=1.0, and a cluster 1112 has the bounding box={(100,100), (200,200)} and the density per pixel=1.0. When the two clusters 1111 and 1112 are merged, a resultant cluster 1113 has the density per pixel of 0.5 and the amount of change in the density per pixel of 1.0. Thus, the amount of change in the density per pixel (degradation level) as a result of the merging of the clusters 1111 and 1112 is more than the threshold, and the clusters 1111 and 1112 thus are determined not to be highly relevant with each other.

When the bounding box of the generated cluster is included in the bounding box of another cluster as illustrated in FIG. 11C, whether the relevance is high is determined based on the area ratio between the clusters. For example, a threshold of the area ratio is set to 150%. When the area of a cluster 1121 is 3600 pixels, and the area of a cluster 1122 is 2500 pixels, the area ratio is 3600/2500=1.4, that is, 140%. Thus, the area ratio (degradation level) between the clusters 1121 and 1122 is less than the threshold 150% and, as a result, the clusters 1121 and 1122 are determined to be highly relevant with each other. In other words, the degradation of the information as a result of merging the clusters 1121 and 1122 is small.

As illustrated in FIG. 11D, when an area of a cluster 1131 is 3600 pixels and an area of a cluster 1132 is 400 pixels, the area ratio between the clusters 1131 and 1132 is 3600/400=9.0, that is, 900%. Thus, the area ratio between the clusters 1131 and 1132 is more than the threshold and, as a result, the clusters 1131 and 1132 are determined to be not highly relevant with each other. In other words, the degradation of the information as a result of the merging of the clusters 1121 and 1122 is large.

In step S1002, the cluster management unit 202 executes processing of merging the cluster, generated in step S501, with the most relevant one of the clusters in the cluster list.

The bounding box, the density per pixel, and the SPL after the merging is obtained as follows, bounding box={(smallest x,y of bounding boxes of merged clusters),(largest x,y of bounding boxes of merged clusters)}, density per pixel=(density per pixel as a result of merging) described above, and SPL={sum of values (SPL×height of bounding box) of merged clusters)}/height of bounding box after merging.

Thus, the cluster management unit 202 has a function of generating a single cluster as a result of merging a plurality of objects in the PDL data in step S1002.

As described above, when a cluster is generated, the cluster is merged with a cluster that is highly relevant with the generated cluster, whereby the number of clusters managed in the final version of the cluster list is regulated, with a smallest possible degradation of the information on the clusters.

In the second exemplary embodiment, the number of clusters managed in the cluster list is regulated by merging the clusters that are highly relevant with each other. According to a third exemplary embodiment, a threshold is set for the number of clusters managed in the cluster list. This is because the number of clusters managed in the cluster list cannot be effectively reduced for PDL data including many objects from which clusters that are not highly relevant with each other are generated. Thus, in the present exemplary embodiment, the cluster management unit 202 determines whether the total number of clusters managed in the cluster list exceeds the threshold when a generated cluster is added to the cluster list. When the total number of clusters exceeds the threshold, a cluster that can be merged with the generated cluster with the smallest degradation level is selected from the cluster list. Thus, the selected cluster and the generated cluster are merged.

The hardware configuration and the software configuration according to the present exemplary embodiment are the same as those in the first exemplary embodiment illustrated in FIGS. 1 and 2, and thus will not be described.

Figure 12:
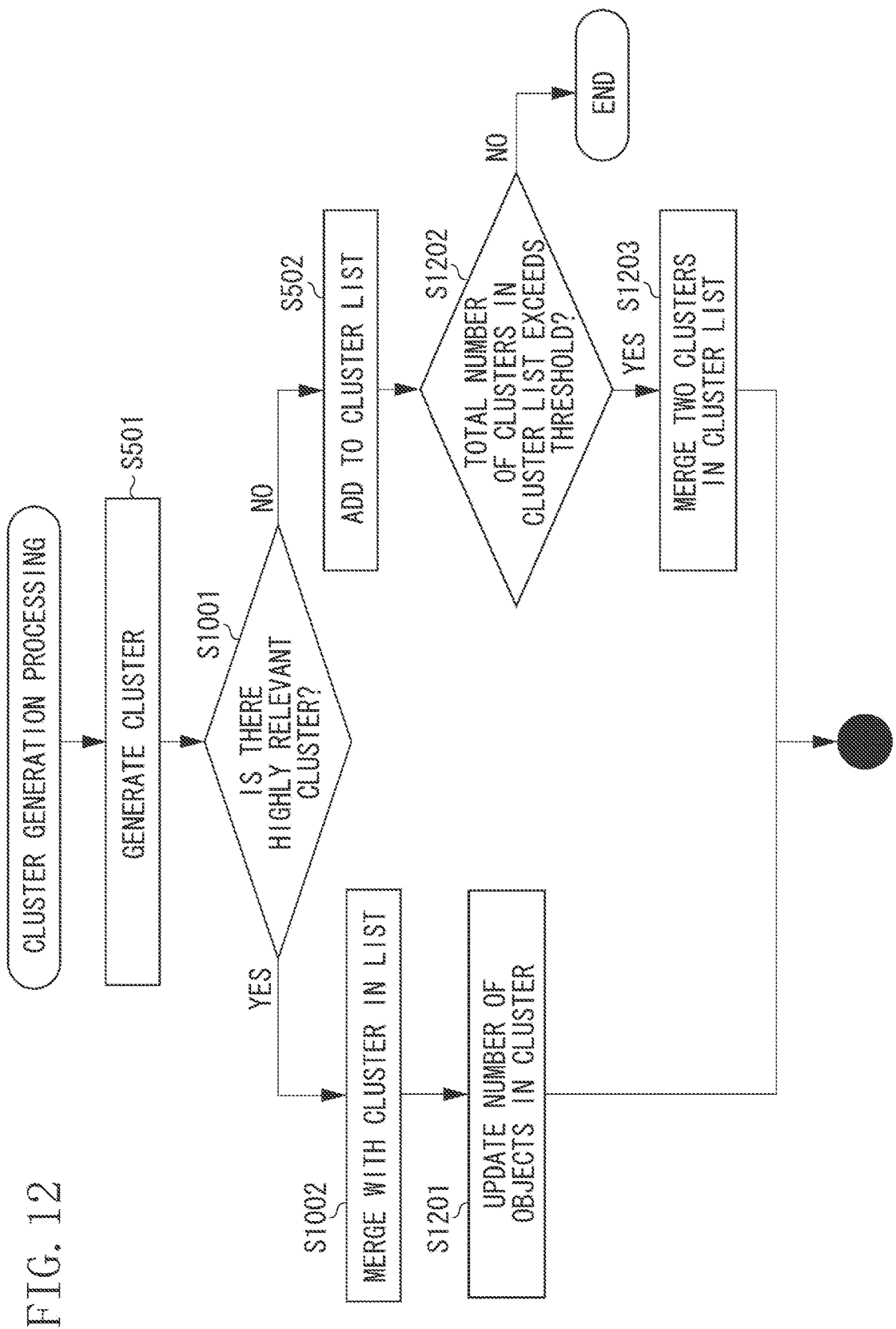
FIG. 12 is a flowchart illustrating cluster generation processing according to a third exemplary embodiment.

In the present exemplary embodiment, the cluster management unit 202 executes processing in a flowchart illustrated in FIG. 12 in step S404 in the flowchart illustrated in FIG. 4. The processing other than that in step S404 is the same as that in the first exemplary embodiment and thus will not be described.

Steps S501, S502, S1001, and S1002 in FIG. 12 are the same as those in the second exemplary embodiment and thus will not be described. In the description below, each cluster in the cluster list includes information on the number of objects (clusters) which has been merged in the cluster (hereinafter, referred to as the number of objects in the cluster), as well as the bounding box, the density per pixel, and the SPL. Whether the merging of each cluster in the cluster list leads to large information degradation is determined by further referring to this information.

In step S1201, for each cluster in the cluster list, the cluster management unit 202 updates the number of objects in the cluster. For example, the clusters 1101 and 1102, illustrated in FIG. 11A, respectively serve as the generated cluster and the cluster in the cluster list, and the number of objects in the cluster 1102 is one. When the clusters 1101 and 1102 are merged in step S1002, the cluster 1102 in the cluster list is updated with the information on the cluster 1103 obtained by the merging. Thus, the number of objects in the cluster 1103 is two.

In step S1202, the cluster management unit 202 determines whether the total number of clusters in the cluster list has exceeded the threshold as a result of adding the generated cluster in step S502. When the total number exceeds the threshold (YES in step S1202), the processing proceeds to step S1203. On the other hand, when the total number does not exceed the threshold (NO in step S1202), the cluster generation processing in the present exemplary embodiment is terminated.

In step S1203, the cluster management unit 202 executes the merging processing on two clusters that can be merged with the lowest information degradation level, selected from all the clusters in the cluster list, so that the number of clusters in the cluster list is regulated. The two clusters are selected based on the information degradation level calculated for each combination between two clusters in the cluster list. The degradation level is obtained from three types of information including the amount of change in the density per pixel that is the same as that in the second exemplary embodiment and thus will not be described, as well as the area ratio between the bounding box, and the number of objects ratio obtained as follows, area ratio between bounding box=largest value of bounding box area of two clusters/smallest value of bounding box area of two clusters, and the number of objects ratio=largest value of the number of objects in two clusters/smallest value of the number of objects in two clusters.

Two clusters to be merged are selected under the following conditions, by referring to each degradation level,
(1) a set of two clusters (pair of clusters) achieving the smallest area ratio is selected,
(2) when there is a plurality of sets of two clusters (pairs of clusters) achieving the smallest area ratio, a set of two clusters achieving the smallest number of objects ratio is selected from the plurality of pairs of clusters,
(3) when there is a plurality of pairs of clusters achieving the same area ratio and the same number of objects ratio, a pair of clusters achieving the smallest amount of change in density per pixel is selected, and
(4) when there is a plurality of pairs of clusters achieving the same area ratio, the same number of objects ratio, and the same amount of change in density per pixel, any one pair is selected from these plurality of pairs of clusters.

These conditions are used for selecting a pair of clusters for the following reason.

Generally, the relationship "a change in the bounding box area>a change in the number of objects in a cluster>a change in the density per pixel of a cluster" applies to the order of the degradation level of the accuracy of the information on the original clusters as a result of merging the clusters.

As described above, when the number of clusters in the cluster list exceeds the threshold, clusters in the cluster list are merged so that the number of clusters is reduced.

The predetermined shape of the cluster, representing each object in the PDL data, is not limited to the rectangle as in the exemplary embodiments described above, and may be any other simple shape according to the shape of the object. For example, an octagonal cluster may be employed for a circular object.

The number of rectangular clusters representing an object is not limited to one as in the exemplary embodiments described above, and may be more than one depending on the shape of the object. This means that a plurality of rectangle segments may be generated when clusters are generated from a single object. For example, for a crossshaped object, clusters as rectangle segments corresponding to two horizontal bars on left and right and one vertical bar in the center may be generated. Thus, even more accurate estimation parameter can be obtained.

A rectangle as a shape of a single cluster representing an object is not limited to the bounding rectangle containing the object, and may be any other rectangle having a shape close to the shape of the object. More specifically, when the object has a convex lens shape, a rectangle having points of intersection with a convex surface of the object may be employed.

An important feature in the exemplary embodiments described above is, when an estimation parameter in consideration of overlap between objects is obtained, to use a cluster of a predetermined shape with which the amount of calculation is efficiently regulated and at the same time information on objects is not largely degraded.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-179098, filed Sep. 11, 2015, which is hereby incorporated by reference herein in its entirety.

What is claimed is:

1. A method for estimating a rendering time of a page, comprising:
   generating, for objects included in the page, a predetermined-shaped object whose shape is a predetermined shape corresponding to a shape of an object;
   identifying, from among the generated predetermined-shaped objects, at least two predetermined-shaped objects which overlap each other;
   estimating the rendering time of the page based on object information of the objects included in the page; and
   displaying time information based on the rendering time,
   wherein the estimating estimates the rendering time in accordance with at least a width and a height of a portion in which the at least two predetermined-shaped objects overlap each other.

2. The method according to claim 1, wherein the estimating includes:
   identifying the portion in which the at least two predetermined-shaped objects overlap each other and another portion of the at least two predetermined-shaped objects excluding the portion;
   generating information used for estimating rendering time corresponding to the identified portion, based on object information of objects corresponding to the at least two predetermined-shaped objects, in accordance with the width and the height of the portion in which the at least two predetermined-shaped objects overlap each other;
   generating other information used for estimating rendering time corresponding to the identified another portion, based on the object information of the objects corresponding to the at least two predetermined-shaped objects, in accordance with a size of the another portion of the at least two predetermined-shaped objects; and
   estimating the rendering time of the page using at least the generated information corresponding to the portion and the generated other information corresponding to the another portion.

3. The method according to claim 1, wherein the generating generates a predetermined-shaped object, based on a position and a shape of an object in the page, associating with information about a position and a size of the predetermined-shaped object,
   wherein the identifying identifies, based on the information about positions and sizes associated with the predetermined-shaped objects, the at least two predetermined-shaped objects which overlap each other, and
   wherein the estimating calculates, based on the information about positions and sizes associated with the at least two predetermined-shaped objects which overlap each other, the width and the height of the portion in which the at least two predetermined-shaped objects overlap each other, and estimates the rendering time in accordance with at least the calculated width and height.

4. The method according to claim 1, wherein a shape of the predetermined-shaped object corresponds to a bounding box of an object.

5. The method according to claim 1, further comprising:
   performing a rendering of the page including the objects; and
   printing data generated by the rendering.

6. The method according to claim 1, wherein the estimating estimates the rendering time in accordance with at least the width and the height of the portion in which the at least two predetermined-shaped objects overlap each other, and widths of the at least two predetermined-shaped objects.

7. The method according to claim 1, further comprising:
   obtaining the object information of the objects included in the page, the object information including edge information indicating edges of the objects;
   generating, for each of the predetermined-shaped objects, an index indicating a ratio of an object corresponding to one of the predetermined-shaped objects to the one of the predetermined-shaped objects and an index indicating the number of spans in a single scan line in the one of the predetermined-shaped objects, based on the edge information about the object corresponding to the one of the predetermined-shaped objects; and associating the generated indexes with the one of the predetermined-shaped objects, wherein the estimating generates, using an index associated with the at least two predetermined-shaped objects, an index indicating a time taken for determining a color of each of the spans included in the portion, and estimates the rendering time based on the generated index, and wherein the index indicating the time is generated in accordance with the width and the height of the portion in which the at least two predetermined-shaped objects overlap each other.

8. The method according to claim 1, wherein the estimating generates, using object information of each of the at least two predetermined-shaped objects, an index indicating a time taken for determining a color in the portion and estimates the rendering time of the page by using the generated index, and wherein the index is generated in accordance with at least the width and the height of the portion in which the at least two predetermined-shaped objects overlap each other.

9. The method according to claim 1, wherein the estimating generates, using the object information about each of the at least two predetermined-shaped objects overlapping each other, an index indicating the rendering time taken for determining a color in the portion in which the at least two predetermined-shaped objects overlap each other, and estimates the rendering time of the page by using at least the generated index, and wherein the index indicating the rendering time is generated, in accordance with a ratio of a width of the portion to a width of one of the at least two predetermined-shaped objects overlapping each other, a ratio of the width of the portion to a width of another one of the at least two predetermined-shaped objects overlapping each other, and a height of the portion.

10. The method according to claim 9, wherein the index is an estimated value of the number of spans included in the portion in which the at least two predetermined-shaped objects overlap each other.

11. An apparatus for estimating a rendering time of a page, comprising:

a memory storing a program; and at least one processor which executes the stored program to function as:

a generating unit configured to generate, for objects included in the page, a predetermined-shaped object whose shape is a predetermined shape corresponding to a shape of an object;

an identifying unit configured to identify, from among the generated predetermined-shaped objects, at least two predetermined-shaped objects which overlap each other;

an estimating unit configured to estimate the rendering time of the page based on object information of the objects included in the page; and a display controlling unit configured to display, on a display, time information based on the rendering time, wherein the estimating unit estimates the rendering time in accordance with at least a width and a height of a portion in which the at least two predetermined-shaped objects overlap each other.

12. The apparatus according to claim 11, wherein the estimating unit further:

identifies the portion in which the at least two predetermined-shaped objects overlap each other and another portion of the at least two predetermined-shaped objects excluding the portion;

generates information used for estimating rendering time corresponding to the identified portion, based on object information of objects corresponding to the at least two predetermined-shaped objects, in accordance with the width and the height of the portion in which the at least two predetermined-shaped objects overlap each other;

generates other information used for estimating rendering time corresponding to the identified another portion, based on the object information of the objects corresponding to the at least two predetermined-shaped objects, in accordance with a size of the another portion of the at least two predetermined-shaped objects; and estimates the rendering time of the page using at least the generated information corresponding to the portion and the generated other information corresponding to the another portion.

13. The apparatus according to claim 11, wherein the generating unit generates a predetermined-shaped object, based on a position and a shape of an object in the page, associating with information about a position and a size of the predetermined-shaped object, wherein the identifying unit identifies, based on the information about positions and sizes associated with the predetermined-shaped objects, the at least two predetermined-shaped objects which overlap each other, and wherein the estimating unit calculates, based on the information about positions and sizes associated with the at least two predetermined-shaped objects which overlap each other, the width and the height of the portion in which the at least two predetermined-shaped objects overlap each other, and estimates the rendering time in accordance with at least the calculated width and height.

14. The apparatus according to claim 11, wherein a shape of the predetermined-shaped object corresponds to a bounding box of an object.

15. The apparatus according to claim 11, further comprising:

the display;

a raster image processor which performs a rendering of the page including the objects; and a printer which prints data generated by the rendering.

16. The apparatus according to claim 11, wherein the estimating unit estimates the rendering time in accordance with at least the width and the height of the portion in which the at least two predetermined-shaped objects overlap each other, and widths of the at least two predetermined-shaped objects.

17. The apparatus according to claim 11, wherein the generating unit further:

obtains the object information of the objects included in the page, the object information including edge information indicating edges of the objects;

generates, for each of the predetermined-shaped objects, an index indicating a ratio of an object corresponding to one of the predetermined-shaped objects to the one of the predetermined-shaped objects and an index indicating the number of spans in a single scan line in the one of the predetermined-shaped objects, based on the edge information about the object corresponding to the one of the predetermined-shaped objects; and associates the generated indexes with the one of the predetermined-shaped objects, and wherein the estimating unit:

generates, using an index associated with the at least two predetermined-shaped objects, an index indicating a time taken for determining a color of each of the spans included in the portion; and estimates the rendering time based on the generated index, wherein, in the generation of the index, the estimating unit generates the index indicating the time in accordance with the width and the height of the portion in which the at least two predetermined-shaped objects overlap each other.

18. The apparatus according to claim 11, wherein the estimating unit generates, using object information of each of the at least two predetermined-shaped objects, an index indicating a time taken for determining a color in the portion and estimates the rendering time of the page by using the generated index, and wherein the estimating unit generates the index in accordance with at least the width and the height of the portion in which the at least two predetermined-shaped objects overlap each other.

19. The apparatus according to claim 11, wherein the estimating unit:

generates, using the object information about each of the at least two predetermined-shaped objects overlapping each other, an index indicating the rendering time taken for determining a color in the portion in which the at least two predetermined-shaped objects overlap each other; and estimates the rendering time of the page by using at least the generated index, wherein the estimating unit generates the index indicating the rendering time, in accordance with a ratio of a width of the portion to a width of one of the at least two predetermined-shaped objects overlapping each other, a ratio of the width of the portion to a width of another one of the at least two predetermined-shaped objects overlapping each other, and a height of the portion.

20. The apparatus according to claim 19, wherein the index is an estimated value of the number of spans included in the portion in which the at least two predetermined-shaped objects overlap each other.

\* \* \* \* \*